(12) United States Patent
Simpson et al.

(10) Patent No.: US 7,623,741 B2
(45) Date of Patent: Nov. 24, 2009

(54) SYSTEM AND METHOD FOR TRANSFERRING SCANNED IMAGING DATA TO A PERSONAL IMAGING REPOSITORY

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1809 days.

(21) Appl. No.: 09/874,191

(22) Filed: Jun. 4, 2001

(65) Prior Publication Data

US 2002/0181804 A1 Dec. 5, 2002

(51) Int. Cl.
G06K 9/54 (2006.01)
G06K 9/60 (2006.01)

(52) U.S. Cl. ........................ 382/306; 382/224; 382/305; 707/10

(58) Field of Classification Search ................ 707/1–10; 382/224–228, 309, 305, 306
See application file for complete search history.

(56) References Cited

U.S. PATENT DOCUMENTS

| | | | |
|---|---|---|---|
| 6,115,739 A * | 9/2000 | Ogawa et al. | 709/215 |
| 6,144,997 A | 11/2000 | Lamming et al. | 709/217 |
| 6,182,892 B1 * | 2/2001 | Angelo et al. | 235/380 |
| 6,426,806 B2 * | 7/2002 | Melen | 358/468 |
| 6,825,942 B1 * | 11/2004 | Kamiyama et al. | 358/1.15 |
| 6,930,709 B1 * | 8/2005 | Creamer et al. | 348/211.3 |

* cited by examiner

*Primary Examiner*—Wesley Tucker

(57) ABSTRACT

A system and method for transferring scanned imaging data from a scanning device to a personal imaging repository. The present invention includes a scanning device capable of reading information encoded items, such as smart cards for scanning imaging data, a personal imaging repository associated with a particular user for storing imaging data that is to be accessed by requested web services, an item for storing user information relating to the personal imaging repository, and a device firmware for storing scanned imaging data from the scanning device into the personal imaging repository, which is an exchange infrastructure between the imaging data and available web services on the Internet.

21 Claims, 3 Drawing Sheets

SYSTEM AND METHOD FOR TRANSFERRING SCANNED IMAGING DATA TO A PERSONAL IMAGING REPOSITORY

The present invention generally relates to an improved system and method for transferring scanned imaging data from a scanning device to a personal imaging repository. More specifically, it relates to an improved system and method for transferring scanned imaging data from a scanning device to a personal imaging repository having an imaging data store for storing the imaging data and a composition store for storing imaging compositions having links to the imaging data serviced as a single unit.

To access imaging data scanned from a scanning device generally requires that the scanning device be connected to a personal computer ("PC") having specialized software that allows the user to save the scanned image, which is typically stored on the user's PC hard disk. However, in order for the user to use these scanned images, the user must typically interact with another software program. For example, it is currently quite popular to convert the images to a Portable Document Format ("PDF") file. It should be understood that the term "imaging data" as read herein refers digital data capable of being represented as two dimensional graphics, such as a PDF file or a Joint Photographic Experts Group ("JPEG") file. Currently, because various programs must be used by the user to utilize these imaging data, it is often necessary for the user to know exactly where these selected images were stored when they were transferred from the scanning device, and it can be difficult to locate the images as a result of the user using multiple programs.

There are currently prior methods that attempt to make the use of scanned imaging data more readily available and store the imaging data in the user desired format. One of these methods allows the user to send the scanned imaging data to an email address without necessarily being connected to a PC. However, this method applies only to emailing the scanned image. If the user wants the scanned image in another format, the user still must pick up the image from email and convert the scanned image to the desired format.

Another known method allows the user to scan an image into a web browser. In this method, the user browses to the web browser to scan on a particular scanning device that is connected to this web browser. After the user scans the image, the image will be displayed as a JPEG image on the browser. The user, using the browser, can then copy, paste, save or print the scanned image.

A related method scans to a web server, rather than the web browser. The user can predefine the web server's location prior to scanning or at the time of the scanning. In this method, the scanned imaging data is simply posted on the web site of the web server, which can then be accessed by the user from a browser. Again, the problem with both of these prior methods is that if the user desires to utilize the scanned image further, the user may have to locate the image from where it was last saved or use yet another software program to convert the scanned image into another format.

BRIEF SUMMARY OF THE INVENTION

The present invention is directed to an improved system and method for transferring scanned imaging data from a scanning device to a personal imaging repository. More particularly, the present invention relates to a system and method for transferring scanned imaging data from a scanning device to a personal imaging repository having an imaging data store for storing the imaging data and a composition store for storing imaging compositions having links to the imaging data serviced as a single unit.

The present invention provides a system that includes a scanning device that is capable of reading an item or indicia for scanning imaging data, a personal imaging repository associated with a particular user for storing imaging data that is to be accessed by requested web services, an item or indicia, such as a smart card for storing user information relating to the personal imaging repository, and a device firmware for storing scanned imaging data from the scanning device into the personal imaging repository. The personal imaging repository is an exchange infrastructure between the imaging data and the available web services on the Internet.

The present invention further provides a method that includes the steps of receiving the scanned imaging data, obtaining user information relating to the personal imaging repository, connecting with the imaging data store of the personal imaging repository indicated from the user information, and transferring the scanned imaging data to the imaging data store.

GLOSSARY OF TERMS AND ACRONYMS

Figure 1:
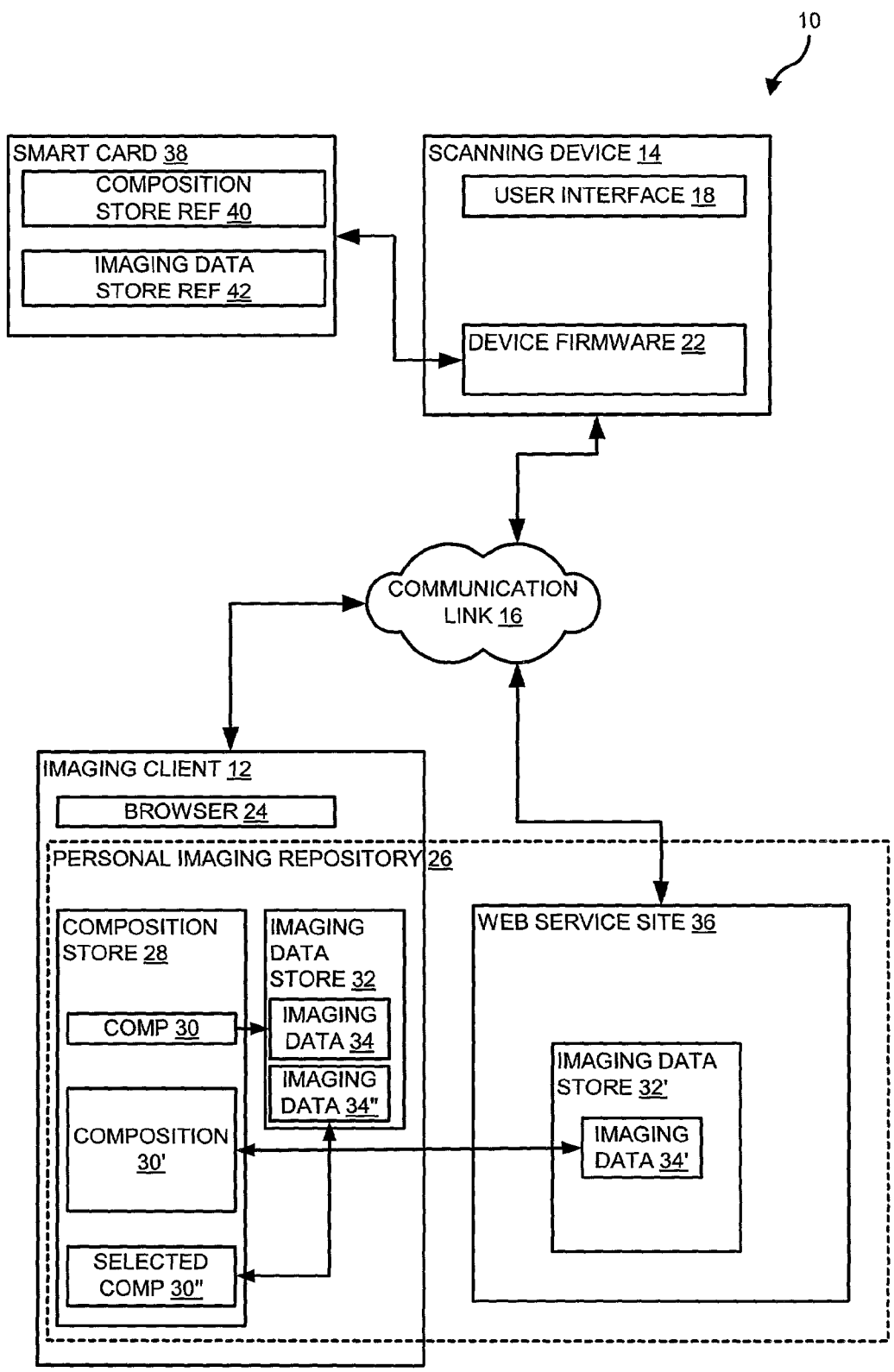
FIG. 1 is a preferred architectural diagram of a network system in which the present invention can be implemented.

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

Composition store. Composition store refers to a network service or a storage device for storing imaging composition(s) that can be accessed by the user or other web services.

Content. A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, Java applet, JavaScript and C-"Sharp" code.

Exchange infrastructure. An exchange infrastructure is a collection of services distributed throughout a network that stores imaging data associated with a particular user through a user profile.

Hyperlink. A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Imaging composition. An imaging composition comprises links to imaging data serviced as a single unit.

Imaging data. Imaging data refers to digital data capable of being represented as two dimensional graphics, such as a Portable Document Format ("PDF") file or a Joint Photographic Experts Group ("JPEG") file.

Imaging data store. Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

Internet. A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the Internet or a network. The general format of a URL is protocol: //machine address:port/path/filename.

User Information. User information is identification and security information used in accessing imaging composition (s) and imaging data associated with a particular user profile. It is preferably accessed either directly or indirectly through methods provided by an extension component integrated into the web browser.

PDA (Personal Digital Assistant). A small hand-held computer used to write notes, track appointments, email and web browser with generally with far less storage capacity than a desktop computer.

Personal imaging repository. A personal imaging repository is a conceptual term describing the exchange infrastructure used to exchange imaging composition and imaging data with web services. Users are associated with their imaging data through user profiles.

DETAILED DESCRIPTION

Broadly stated, the present invention is directed to an improved system and method for transferring scanned imaging data from a scanning device to a personal imaging repository. The system and method provide for transferring scanned imaging data from a scanning device capable of reading smart cards to a personal imaging repository having an imaging data store for storing the imaging data and a composition store for storing imaging compositions having links to the imaging data serviced as a single unit. In addition, the personal imaging repository acts as an exchange infrastructure for any available web services on the Internet. As a result, users can utilize images from a scanning device more readily and easily.

The preferred network system in which the present invention can be implemented is shown in FIG. 1 and indicated generally at 10. Because there are numerous ways of implementing the network topology of the present invention, the current preferred network system is just one way to implement the present invention. As a result, it should be understood that other network topologies are contemplated and are within the scope of the present invention. In the preferred embodiment, an imaging client computer 12 is connected to a scanning device 14 via a connection link 16. The scanning device further includes a user interface 18 and a device firmware 22. The user interface 18 provides a way for the users to interact with the scanning device to request certain functionalities, such as scanning. The device firmware 22, on other hand, includes specific programming instructions that make certain functionalities of the scanning device available.

For the imaging client 12, it preferably includes a browser 24 and a personal imaging repository 26. The personal imaging repository 26 includes a composition store 28 for storing imaging composition(s) 30, 30', 30" of the imaging data that are serviced as a single unit and an imaging data store 32, i.e., digital memory, for storing the imaging data 34, 34', 34". An imaging composition 30, 30', 30" preferably comprises links to the imaging data, which can be located at another web service's site. As a result, the composition store 34 stores only the imaging compositions 30, 30', 30". The imaging data store 32, 32', on the other hand, is any imaging data store located on any computer that contains the imaging data 34, 34', 34". More specifically, each web service can have its own imaging data store 32' available to the public.

For example, at some previous time, a user may print an article from a web service site 36, resulting in an imaging composition 30' being created and stored in the user's composition store 28. The imaging composition 30' contains only the link to the imaging data 34' for this article stored on the web service site 36. Consequently, the imaging data 34' for the article is not in the imaging data store 32 located on the imaging client 12. Rather, the imaging data 34' is stored in the imaging data store 32' located on the web service site 36. Of course, users will have an imaging data store 32 that belongs to their user identification where they can store imaging data 34, 34", which is the imaging data store shown in the imaging client 12. As a result, the term "personal imaging repository" 26 is meant as a conceptual term for an exchange infrastructure between the imaging data and the available web services on the Internet. Similarly, the term "web" denotes millions of distinct servers that comprise the web. However, the web does not actually do anything itself. Similarly, the servers serving the composition store 28 and the imaging data stores 32, 32' are physical implementations of the personal imaging repository as a concept.

In this implementation, the scanning device 14 is capable of reading items, such as smart cards 38, which are inserted into the scanning device by a user who wants to scan on the device. The smart card 38 is a plastic card (e.g., similar to a credit card) with an embedded integrated circuit for storing information. In this case, the smart card contains user information relating to the personal imaging repository 26, such as a composition store reference 40 and an imaging data store reference 42. While the smart card is a preferred implementation for use with the scanning device 14, it should be understood that other items may used. For example, an item may have a bar code or other optically, magnetically or electronically encoded information that could be scanned. Other items, such as a transponder could be employed. The important consideration is that the item has sufficient informational capacity and that information can be read by the scanning device 14 or otherwise transferred to it. The user information references 40, 42 instruct the scanning device where to store the scanned imaging data.

As a result, the personal imaging repository 26 becomes the exchange infrastructure for the imaging data for the web services that are available on the Internet. Users no longer have to remember in which directory they placed the scanned imaging data. Furthermore, the user will no longer be asked where to store the scanned imaging data, because it is automatically stored in the personal imaging repository when the user scans an imaging data on the scanning device.

In this preferred implementation, whenever an imaging data 34, 34' is scanned from the scanning device 14, the imaging data will be stored automatically in the personal imaging repository 26 that is associated with the user information provided to the scanning device. In other words, users will no longer be asked to indicate a place where the imaging data should be saved to. Rather, the imaging data from the scanning device will be automatically transferred to the user's personal imaging repository 26. From the personal imaging repository 26, other web services that are available on the Internet should be configured to look into the personal imaging repository 26 to access particular imaging data that have been requested for servicing.

It should be noted that the personal imaging repository 26 can represent any type of data storage device. In fact, the data storage device 26 does not necessarily have to be located within the imaging client computer 12. The personal imaging repository 26 can be located, for example, on another storage medium, which the client machine can access through alternative communication links. Although it is currently preferred to include the personal imaging repository 26 with the imaging client 12, this would likely change as bandwidth becomes faster and the popularity of the personal digital assistant ("PDA") increases. These alternative implementations are contemplated and should be considered to be within the scope of the present invention.

Figure 2:
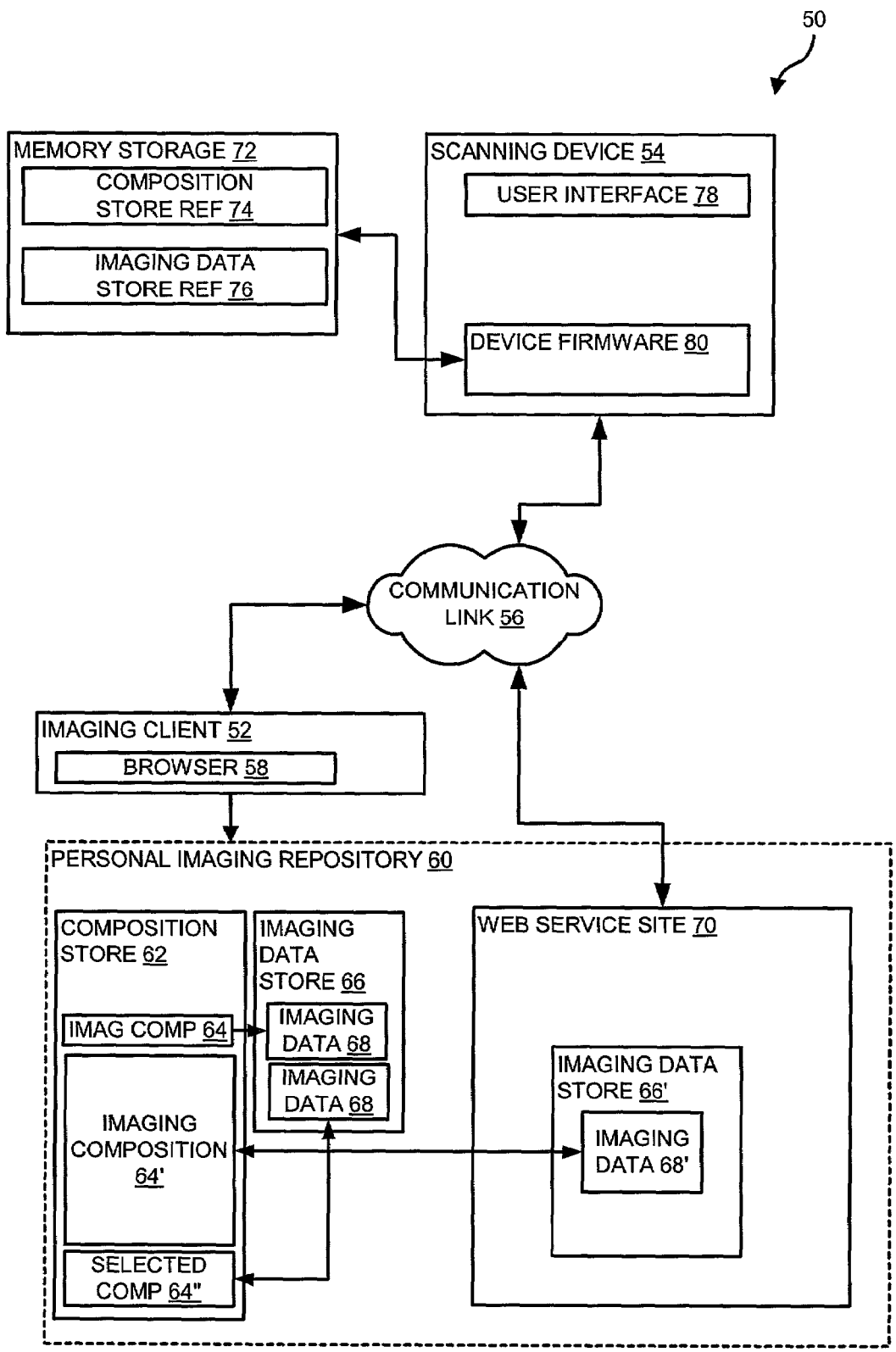
FIG. 2 is an architectural diagram of a second network system in which the present invention can be implemented; and, FIG. 3 is a flowchart illustrating the preferred functionality of the scan method of the present invention.

A second network system is shown in FIG. 2, and indicated generally at 50. In this embodiment, the imaging client 52 is linked to a scanning device 54 over a communication link 56. The imaging client 52 similarly includes a browser 58. However, unlike the previous implementation, the personal imaging repository 60 is only linked to the imaging client 52. For example, the personal imaging repository 60 is only a general data storage device, or it may be another computer connected to the imaging client. In fact, the imaging client 52 can be a PDA that links to the personal imaging repository 60 by using a cradle, which is quite common for such PDAs. The personal imaging repository 60 similarly includes a composition store 62 for storing imaging compositions 64 and an imaging data store 66 for storing imaging data 68. As shown, one of the imaging compositions 64' can be linked to an imaging data 68' that is located on a web service site 70. Also, an imaging composition 64" is a selected composition in the composition store, meaning it will be selected for servicing.

Another difference from the previous embodiment is that, rather than using smart cards, the user information is stored on any memory storage 72, which preferably includes a composition store reference 74 and an imaging data store reference 76 for indicating a specific personal imaging repository that the scanned imaging data should be stored in. Alternatively, numerous personal imaging repository references can be stored in the memory storage 72. The memory storage 72, in turn, can link to the scanning device 54, and, using an user interface 78, select the specific personal imaging repository. There is firmware 80 in the scanning device 54 that stores the scanned imaging data to the personal imaging repository 60 indicated by user information. There are numerous alternative ways to implement the network topology of the present invention, and it should be understood that these other alternatives are contemplated and within the scope of the present invention.

Figure 3:
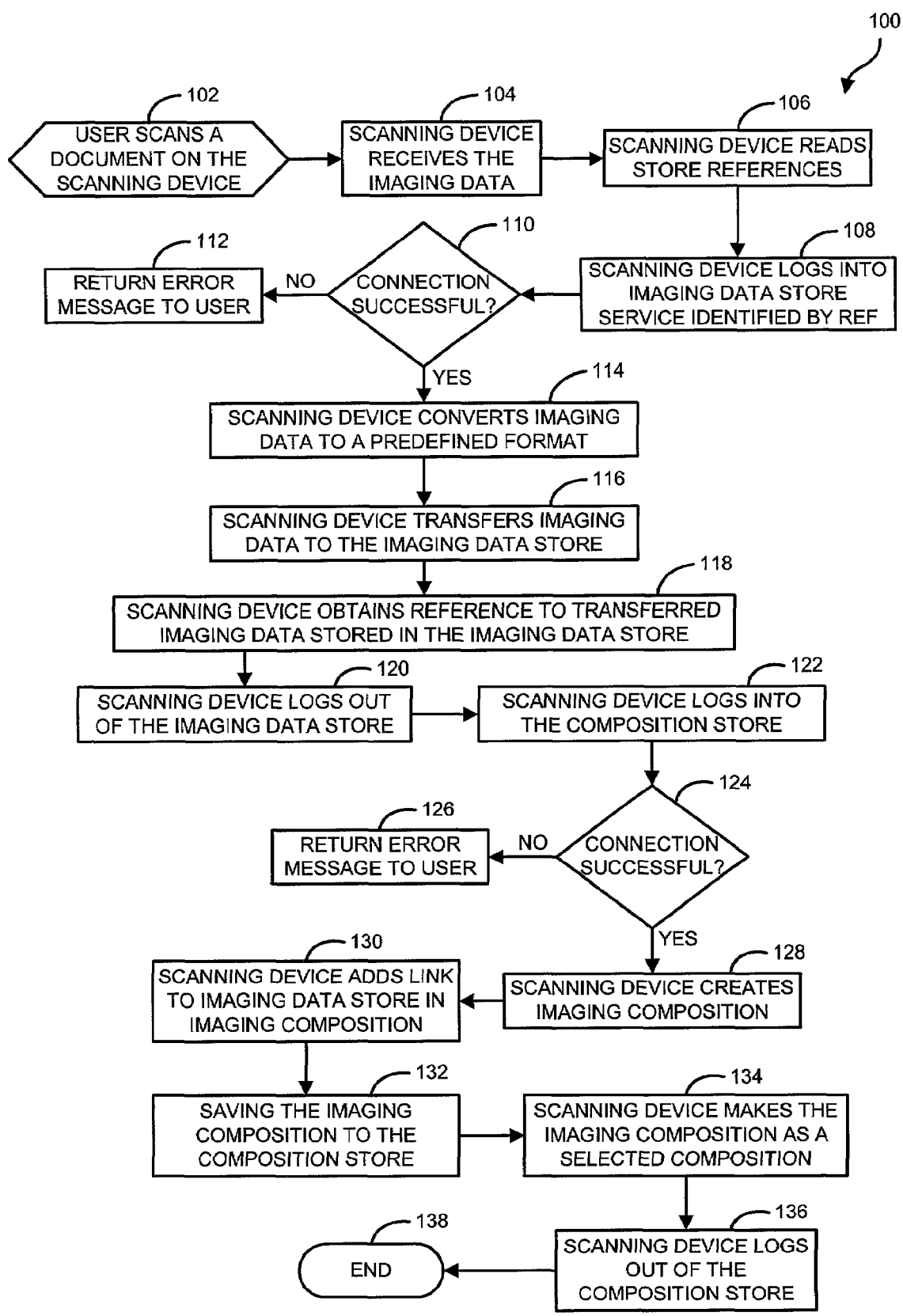

Turning to an important aspect of the present invention, a flow chart of the preferred functionality of the scan method is shown in FIG. 3, and indicated generally at 100. The scan method is initiated by the user scanning a document on the scanning device (block 102). The scanning of a document will cause the scanning device to receive an imaging data of the scanned document (block 104). Next, the scanning device reads the store references (block 106), which include the imaging store reference and the composition store reference. The store references are preferably either stored on a smart card or on a storage memory linked to the scanning device. In the preferred implementation, it is preferred that a smart card identifying the personal imaging repository (i.e., the store references) be inserted into the scanning device before the user can use the scanning device to scan any document. In the second implementation, the user information relating to the personal imaging repository is preferably predefined before the scanning device can be used for scanning.

After obtaining the information on the imaging data store from the store references (block 106), the scanning device can now log into the imaging data store service (block 108). At this point, it is determined whether the connection to the imaging data store is successful (block 110), and if not, an error message is sent to the user (block 112). Once it is established that a connection to the imaging data store is successful (block 110), the scanning device converts the imaging data into a predefined format, such as JPEG, (block 114) and accordingly transfers the scanned imaging data in the converted format to the imaging data store (block 116). The scanning device obtains a reference to the transferred imaging data (block 118), and it will log out of the imaging data store (block 120) and log into the composition store (block 122). Again, it is determined whether the connection to the composition store is successful (block 124). Another error message is sent to the user (block 126) if the connection was unsuccessful (block 124). After a successful connection to the composition store (block 124), the scanning device creates an imaging composition (block 128) and adds the reference to the imaging data stored in the imaging data store obtained earlier in the imaging composition (block 130). This newly created imaging composition is then saved to the composition store (block 132), and further set as a selected imaging composition in the composition store (block 134). Because the imaging composition is set as the selected composition, it will be used by web services that make use of the selected composition of the personal imaging repository. Finally, the scanning device logs out of the composition store (block 136), which brings the scan method to an end (block 138) until the next scan is initiated on the scanning device.

It should be noted that the order of the scan method can be varied and changed depending on the implementation of the present invention. An alternative method is logging into either one of the stores, and upon successful connection, the scanning device then immediately logs into the other store prior to performing any further steps. More specifically, for example, the scanning device can first log into the imaging data store. Upon a successful connection with the imaging data store, the scanning device next logs into the composition store. Once it is established that the scanning device has successfully logged into both the imaging data store and the composition store, only then would the remaining steps be processed. This alternative method ensures that the imaging data is not unnecessarily transferred to the imaging data store when an imaging composition of the transferred imaging data can not be added to the composition store due to a connection failure. This method is especially preferred when the composition store resides on a separate location other than the imaging client as shown in FIG. 2.

From the foregoing description, it should be understood that an improved system and method for transferring scanned imaging data from a scanning device to a personal imaging repository has been shown and described, which has many desirable attributes and advantages. The system and method provides for transferring scanned imaging data from a scanning device to a personal imaging repository that acts as an exchange infrastructure between the imaging data and web services that are available on the Internet. Users no longer need to recall where their previous transferred images are located on their hard disk. The present invention allows the user to transfer scanned imaging data from a scanning device that allows for greater flexibility for the user. In addition, users can manage their imaging data more easily with fewer limitations.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for transferring scanned imaging data from a scanning device to a personal imaging repository, comprising:
 a scanning device capable of scanning imaging data;
 the scanning device configured to obtain user information relating to a personal imaging repository associated with a particular user for storing imaging data that is to be accessed by remote web services; and,
 a device firmware being part of the scanning device for storing scanned imaging data from the scanning device into said personal imaging repository, and being configured to store a link reference to the scanned imaging data in a centralized data store associated to the particular user;
 wherein said personal imaging repository is an exchange infrastructure between the imaging data and the remote web services on the Internet by allowing the remote web services to locate imaging data associated with the particular user by accessing the centralized data store.

2. The system as defined in claim 1 wherein said personal imaging repository stores the imaging data in a plurality of file formats.

3. The system as defined in claim 1 wherein said personal imaging repository comprises an imaging data store assigned to the user for storing imaging data.

4. The system as defined in claim 1 wherein said personal imaging repository comprises a plurality of imaging data stores for storing imaging data.

5. The system as defined in claim 4 wherein one of said plurality of imaging data stores is assigned to the user for storing imaging data.

6. The system as defined in claim 4 wherein one or said plurality of imaging data stores is assigned to a web service for storing imaging data provided by the web service.

7. The system as defined in claim 1 wherein the centralized data store comprises a composition store for storing imaging compositions of the imaging data.

8. The system as defined in claim 7 wherein said imaging composition comprises a link reference for each imaging data.

9. The system as defined in claim 1 wherein said personal imaging repository is located on another data storage device that is linked to an imaging client.

10. The system as defined in claim 1 wherein said scanning device being configured to obtain user information from smart card.

11. A method for transferring scanned imaging data from a scanning device to a personal imaging repository having one or more imaging data stores for storing the imaging data of a user and a composition store for storing imaging compositions having links to the imaging data, said method comprising:
 receiving the scanned imaging data;

obtaining, by the scanning device, user information relating to the personal imaging repository that identifies an imaging data store and a composition store associated to the user;

connecting, by the scanning device, with the imaging data store of the personal imaging repository indicated from the user information;

transferring, by the scanning device, the scanned imaging data to the imaging data store; and storing by the scanning device, in the composition store associated to the user, a link reference that identifies a location of the scanned imaging data where the composition store maintains a plurality of link references to a plurality of imaging data that may be stored in separate imaging data stores.

12. The method according to claim 11 further comprising the steps of:

obtaining the link reference of the scanned imaging data stored in the imaging data store; and, disconnecting from the imaging data store by the scanning device.

13. The method according to claim 11 wherein said step of connecting with the imaging data store further comprising the steps of:

determining whether the connection with the imaging data store is successful;

returning an error message to the user when the connection is not successful; and, converting the scanned imaging data into a predefined format.

14. The method according to claim 13 wherein said predefined format is any one from the group consisting of:

Joint Photographic Experts Group Format;
Graphics Interchange Format;
Portable Network Graphics Format;
Tagged Image File Format;
Portable Document Format; and,
Microsoft Windows bitmap format.

15. The method according to claim 11 where the storing comprising the steps of:

obtaining the link reference of the scanned imaging data stored in the imaging data store;

connecting with the composition store of the personal imaging repository indicated from the user information;

creating an imaging composition having the link reference to the scanned imaging data stored in the imaging data store; and, saving the imaging composition to the composition store.

16. The method according to claim 15 further comprising the steps of:

setting the imaging composition as a selected composition available for service in the composition store; and, disconnecting from the composition store of the personal imaging repository.

17. The method according to claim 15 wherein prior to the step of creating an imaging composition further comprising the steps of:

determining whether the connection with the composition store is successful; and, returning an error message to the user when the connection to the composition is not successful.

18. The method according to claim 15 wherein said step of creating an imaging composition further comprising the step of adding the link reference of the imaging data stored in the imaging data store to the imaging composition.

19. A computer program product comprising a computer usable medium having computer readable program codes embodied in the medium that when installed in a scanning device linked to a personal imaging repository with an imaging data store for storing the imaging data and a composition store for storing imaging compositions with links to the imaging data, the product causes the scanning device to:

receive scanned imaging data;

obtain user information relating to the personal imaging repository;

connect with the imaging data store of the personal imaging repository indicated from the user information;

transfer the scanned imaging data to the imaging data store; and transfer a link to a composition store associated with the user, the composition store being configured to contain link references to a plurality of image data associated with the user that may be stored in different imaging data stores on remote devices.

20. A computer program product comprising readable program codes that when executed causes a scanning device to perform a method, the method comprising:

receiving references to a personal imaging repository of a user, the references including a data store reference that identifies an imaging data store for storing scanned image data and a composition store reference that identifies a composition store for storing link references to scanned image data associated with the user;

transferring a scanned image data to the image data store using the data store reference;

obtaining a link reference to the scanned image data transferred to the image data store; and causing the link reference to be stored in a composition store identified by the composition store reference where the composition store can be accessed by a plurality of remote web services to identify locations of scanned image data associated with the user.

21. The computer program product of claim 20 where the locations of the scanned image data can include multiple remote locations.

* * * * *

UNITED STATES PATENT AND TRADEMARK OFFICE
CERTIFICATE OF CORRECTION

PATENT NO.        : 7,623,741 B2                                           Page 1 of 1
APPLICATION NO.   : 09/874191
DATED             : November 24, 2009
INVENTOR(S)       : Shell S. Simpson et al.

It is certified that error appears in the above-identified patent and that said Letters Patent is hereby corrected as shown below:

In column 8, line 46, in Claim 6, delete "or" and insert -- of --, therefor.

In column 8, line 59, in Claim 10, after "from" insert -- a --.

Signed and Sealed this

Thirty-first Day of August, 2010

David J. Kappos
*Director of the United States Patent and Trademark Office*